(12) United States Patent
Sakuma et al.

(10) Patent No.: US 12,043,482 B2
(45) Date of Patent: Jul. 23, 2024

(54) COGNITIVE ROTATABLE ITEM STORAGE WITH AUTOMATED REPLENISHMENT

(71) Applicant: International Business Machines Corporation, Armonk, NY (US)

(72) Inventors: Katsuyuki Sakuma, Fishkill, NY (US); Sarbajit K. Rakshit, Kolkata (IN); Chandrasekhar Narayanaswami, Wilton, CT (US)

(73) Assignee: International Business Machines Corporation, Armonk, NY (US)

( * ) Notice: Subject to any disclaimer, the term of this patent is extended or adjusted under 35 U.S.C. 154(b) by 802 days.

(21) Appl. No.: 17/111,546

(22) Filed: Dec. 4, 2020

(65) Prior Publication Data
US 2022/0177221 A1      Jun. 9, 2022

(51) Int. Cl.
*B65G 33/04*        (2006.01)
*B65G 1/00*         (2006.01)
(Continued)

(52) U.S. Cl.
CPC ............. *B65G 1/045* (2013.01); *B65G 1/137* (2013.01); *B65G 33/04* (2013.01); *G07F 11/16* (2013.01);
(Continued)

(58) Field of Classification Search
CPC ........ B65G 1/045; B65G 1/137; B65G 33/04; B65G 2203/0241; G07F 11/16; G07F 11/54; A47F 1/02
See application file for complete search history.

(56) References Cited

U.S. PATENT DOCUMENTS 5,042,686 A * 8/1991 Stucki ................. G07F 11/54
                                                    194/906
10,867,463 B2 * 12/2020 Jafa ..................... G07F 11/62
(Continued)

FOREIGN PATENT DOCUMENTS

CN       204173419 U  *  2/2015
CN       204173419 U     2/2015
(Continued)

OTHER PUBLICATIONS

International Search Report and Written Opinion dated Jan. 27, 2021, for International Application No. PCT/CN2021/125996, filed Oct. 25, 2021.
(Continued)

*Primary Examiner* — Lynn E Schwenning
*Assistant Examiner* — Lucia Elba Rodriguez
(74) *Attorney, Agent, or Firm* — Matthew Zehrer

(57) ABSTRACT

An item storage system includes a shelving portion and a replenishment portion. The shelving portion includes: a first shelf having a toroidal shape with a center axis; and a second shelf having a toroidal shape that is spaced apart from the first shelf along the center axis. The replenishment portion includes: an elevator portion configured to deliver items to the first shelf and the second shelf, wherein at least part of the elevator portion is positioned in the center of the shelving portion and is surrounded by the shelving portion; and a storing portion configured to load items into the elevator portion, wherein the storing portion is positioned above or below the shelving portion.

15 Claims, 10 Drawing Sheets

(51) Int. Cl.
*B65G 1/04* (2006.01)
*B65G 1/137* (2006.01)
*G07F 11/16* (2006.01)
*G07F 11/54* (2006.01)

(52) U.S. Cl.
CPC ...... *G07F 11/54* (2013.01); *B65G 2203/0241* (2013.01)

(56) References Cited

U.S. PATENT DOCUMENTS

| | | | | |
|---|---|---|---|---|
| 2006/0269384 | A1* | 11/2006 | Kiaie | B25J 9/0096 |
| 2014/0367399 | A1* | 12/2014 | Smith | G07F 9/026 |
| | | | | 221/133 |
| 2018/0082757 | A1* | 3/2018 | Chambers | G07F 11/165 |
| 2018/0319607 | A1 | 11/2018 | Nemati | |
| 2019/0114866 | A1 | 4/2019 | Yoshida | |
| 2020/0090445 | A1* | 3/2020 | Jafa | G07F 9/10 |

FOREIGN PATENT DOCUMENTS

| | | | | |
|---|---|---|---|---|
| CN | 205771352 | U | 12/2016 | |
| CN | 108190344 | A * | 6/2018 | ............ B65G 1/04 |
| CN | 108190344 | A | 6/2018 | |
| CN | 108577215 | A | 9/2018 | |
| CN | 110712912 | A | 1/2020 | |
| EP | 2503520 | A | 9/2012 | |
| EP | 2503520 | A1 * | 9/2012 | ............ G07F 11/54 |
| FR | 2613203 | * | 3/1987 | |
| WO | 2019174202 | A1 | 9/2019 | |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pages.

* cited by examiner

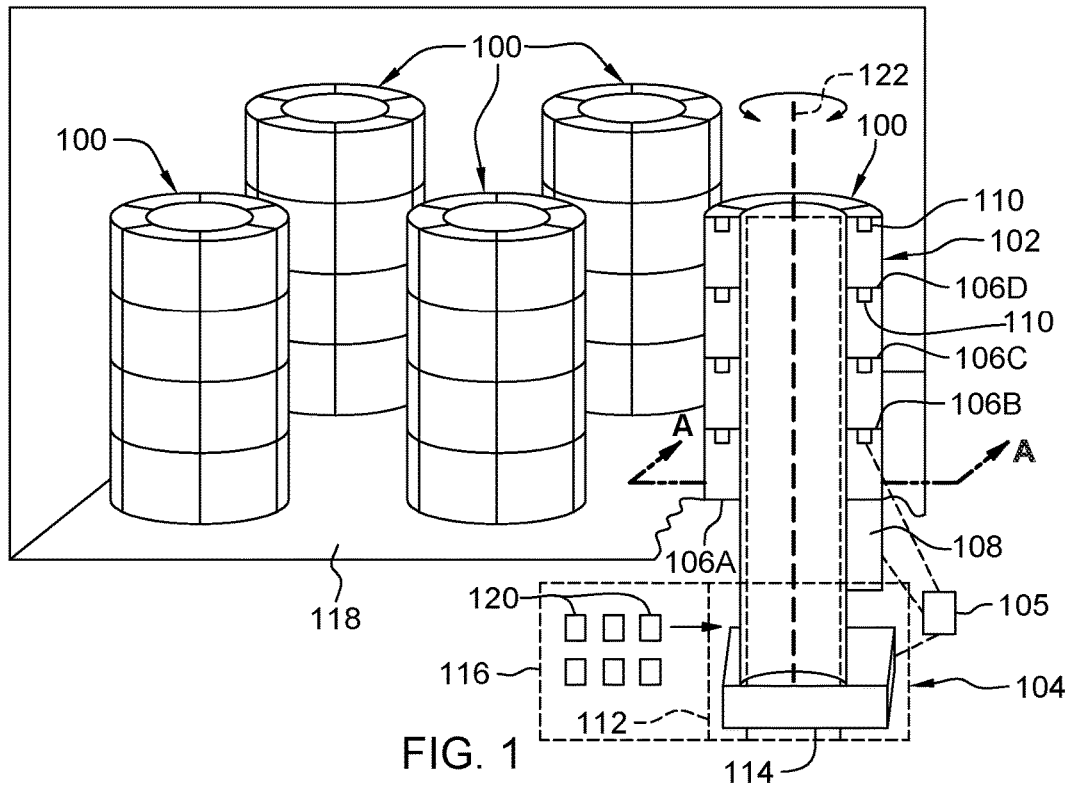
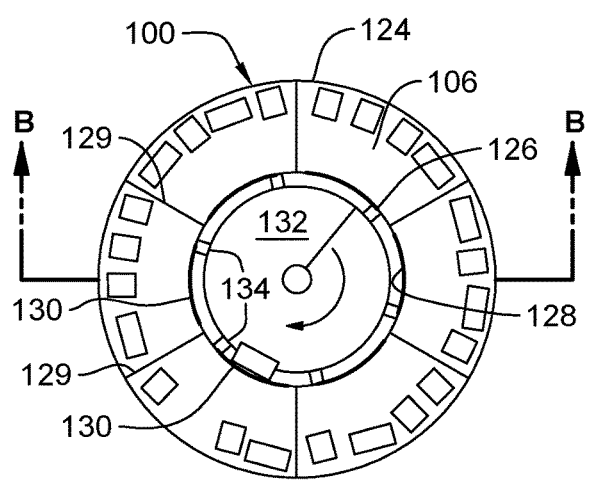
FIG. 2A
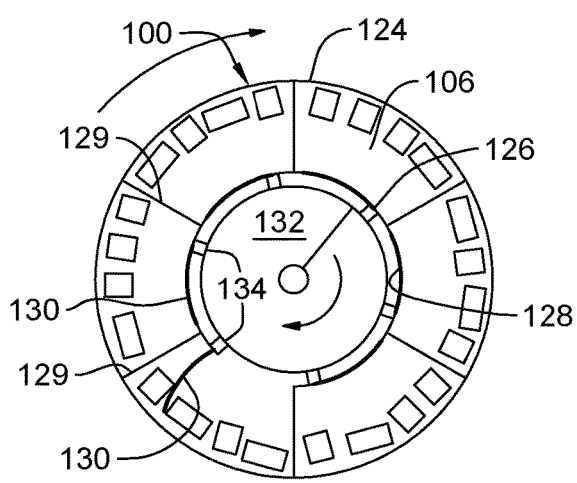
FIG. 2B

12,043,482 B2

COGNITIVE ROTATABLE ITEM STORAGE WITH AUTOMATED REPLENISHMENT

BACKGROUND

The present invention relates to product storage, and more specifically, to rotatable shelving with automated replenishment.

Traditional retail venues use fixed, front-loaded shelving displays. When a product is purchased by a consumer, an employee of the store then has to notice that the item is missing, find another of that same item in the stock room, and place the replacement item on the shelf. This process can cost the store time and money. In addition, having fixed shelving means that the consumer has to move themselves directly in front of where each product is that they want to purchase. This can cost the consumer time and energy.

SUMMARY

According to an embodiment of the present disclosure, an item storage system includes a shelving portion and a replenishment portion. The shelving portion includes: a first shelf having a toroidal shape with a center axis; and a second shelf having a toroidal shape that is spaced apart from the first shelf along the center axis. The replenishment portion is surrounded by the shelving portion and includes: an elevator portion configured to deliver items to the first shelf and the second shelf, wherein at least part of the elevator portion is positioned in the center of the shelving portion and is surrounded by the shelving portion; and a storing portion configured to load items into the elevator portion, wherein the storing portion is positioned above or below the shelving portion.

According to an embodiment of the present disclosure, an item storage system includes a shelving portion and a replenishment portion. The shelving portion includes: a first shelf that is rotatable about a center axis; a second shelf that is rotatable about the center axis and is spaced apart from the first shelf; and an actuator connected to the first shelf and the second shelf that is configured to rotate the first shelf and the second shelf. The replenishment portion is positioned adjacent to the shelving portion and includes: an elevator portion configured to deliver items to the first shelf and the second shelf; and a storing portion configured to load items into the elevator portion.

According to an embodiment of the present disclosure, a method of operating an item storage system including a shelving portion with a toroidally-shaped shelf, a replenishment portion surrounded by the shelf, a controller, and a sensor connected to the controller is disclosed. The method includes monitoring, by a sensor, items on the shelf; determining, by the controller, if there is a sufficient number of items positioned on the shelf; and causing, by the controller, the replenishment portion to add an additional item to the shelf by: moving the additional item from a storage portion to an elevator portion surrounded by the shelf; moving the additional item to a level of the shelf via the elevator portion; and moving the additional item from the elevator portion to the shelf.

BRIEF DESCRIPTION OF THE DRAWINGS

FIG. 1 is a partially cut away perspective view of an array of item storage systems, in accordance with an embodiment of the present disclosure.

FIG. 2A is a cross-section top view of an item storage system along line A-A in FIG. 1, in accordance with an embodiment of the present disclosure.

FIG. 2B is a cross-section top view of an item storage system along line A-A in FIG. 1, in accordance with an embodiment of the present disclosure.

DETAILED DESCRIPTION

Figure 2C:
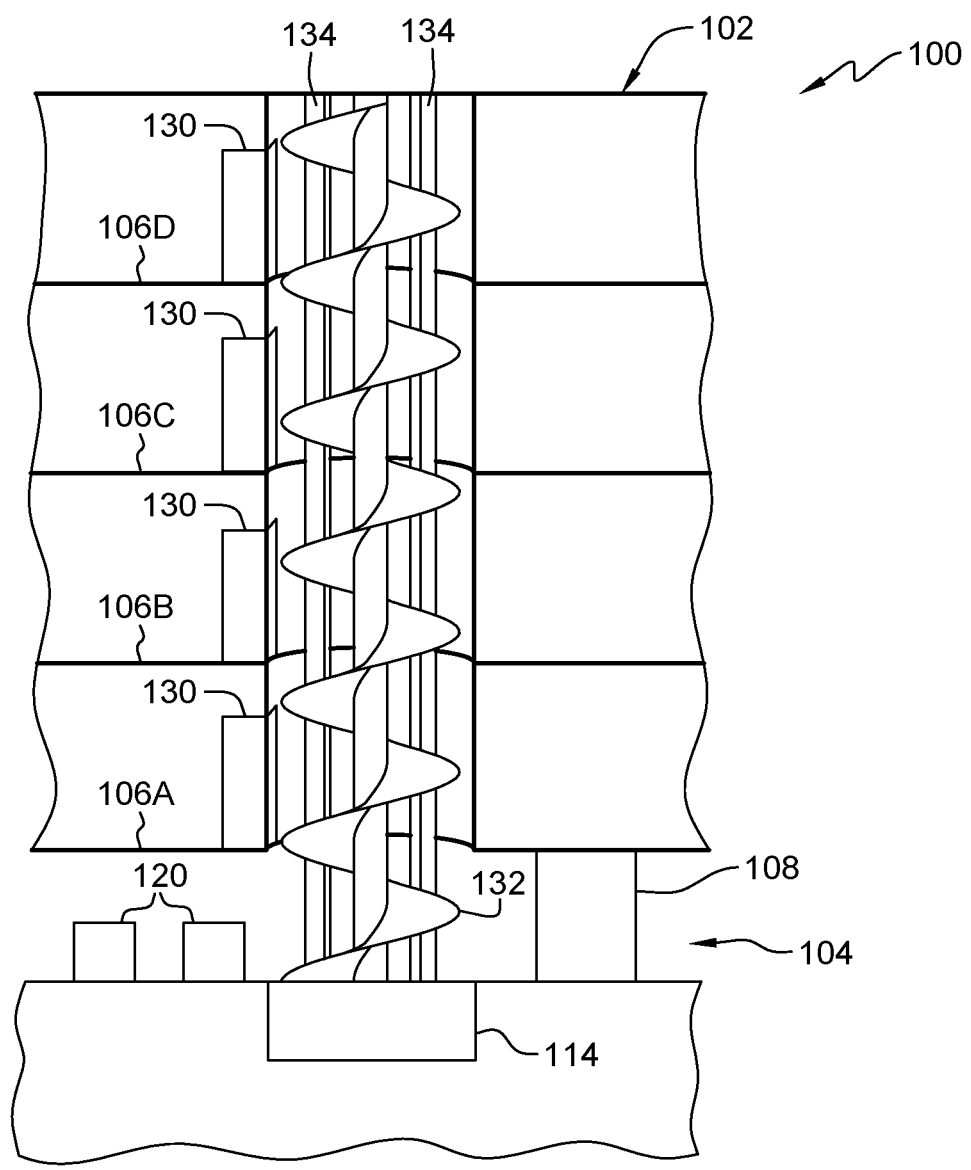
FIG. 2C is a cross-section side view of an item storage system along line B-B in FIG. 2A, in accordance with an embodiment of the present disclosure.

FIG. 1 is a partially cut away perspective view of an array of item storage systems (ISS) 100. ISS 100 comprises shelving portion 102, replenishment portion 104, and controller 105. Shelving portion 102 comprises shelves 106A-106D (collectively, shelves 106), shelf actuator 108, and sensors 110. Replenishment portion 104 comprises elevator portion 112, elevator actuator 114, and storing portion 116. While ISS 100 will be discussed in a consumer retail context, ISS 100 could be useful in any context where a user seeks to find items that are stored locally.

In the illustrated embodiment, ISSs 100 have shelving portions 102 above floor 118, and replenishment portion 104 both above and beneath floor 118 (i.e., storing portion 116 is beneath floor 118 and elevator portion 112 extends through floor 118). Items 120 are stored in replenishment portion 104 and can be selectively delivered to shelving portion 102 to be displayed and made available for a consumer (not shown) to pick up and purchase. This can occur because controller 105 is communicatively connected to shelving portion 102 and replenishment portion 104. For example, controller 105 can use sensors 110 (e.g., cameras) to detect that there is an insufficient number of a given item 120 on a given shelf 106. Then, controller 105 can call for that item 120 to be picked and loaded into elevator portion 112 (e.g., by structures and processes in storing portion 116 that are known to a person having ordinary skill in the art). Item 120 can then be raised to its destination shelf 106 by elevator actuator 114 powering elevator portion 112. Once item 120 is delivered to the particular shelf 106, shelf actuator 108 can rotate shelves 106 about shelf axis 122 to better position item 120 for a consumer.

Depicted in FIG. 1 is one embodiment of the present disclosure, to which there are alternative embodiments. For example, replenishment portion 104 can be positioned on top of shelving portion 102 (e.g., such that storing portion 116 is above the ceiling). In addition, sensors 110 can be any suitable apparatus to measure the presence or absence of items 120, such as, for example, optical sensors, Internet of Things devices, or radio frequency identification (RFID) readers. In some embodiments, corresponding equipment can be added to items 120, such as RFID tags. In addition, shelving portion 102 can have greater than or fewer than four spaced-apart shelves 106.

FIG. 2A is a cross-section top view of ISS 100 along line A-A in FIG. 1. FIG. 2B is a cross-section top view of ISS 100 along line A-A in FIG. 1. FIG. 2C is a cross-section side view of ISS 100 along line B-B in FIG. 2A. FIGS. 2A-2C will now be discussed in conjunction with each other.

In the illustrated embodiment, shelves 106 have a flattened toroidal shape (e.g., the shape can be described as a revolution of a rectangle that is spaced apart from shelf axis 122) so that there is outer side 124 and inner side 126. While outer side 124 is depicted as being circular, for the purposes of this disclosure, outer side 124 can have other shapes and still be considered to have a toroidal shape. For example, if outer side 124 has at least six sides, then it is equivalent to a circular configuration. Similarly, while inner side 126 is depicted as being circular, for the purposes of this disclosure, inner side 126 can have other shapes and still be considered to have a toroidal shape. For example, if inner side 126 has at least six sides, then it is equivalent to a circular configuration.

In the illustrated embodiment, shelves 106 are open on outer sides 124 and are connected to elevator shaft 128 at inner sides 126. In addition, shelves 106 are separated into sectors by dividers 129 that extend between adjacent shelves 106. Elevator shaft 128 is a hollow tube with automated doors 130 (controlled by controller 105) at each of the different heights of shelves 106. Thereby, shelves 106 and elevator shaft 128 surround the top end part of elevator portion 112 such that elevator portion 112 is in the center of shelves 106 and elevator shaft 128, and inner sides 126 and elevator shaft 128 are adjacent to the outer side of elevator portion 112. While elevator portion 112 is depicted as being completely surrounded by shelves 106 and elevator shaft 128, for the purposes of this disclosure, shelves 106 and/or elevator shaft 128 can subtend less than three-hundred-sixty degrees around elevator portion 112 and still be considered to be surrounding. For example, if shelves 106 and/or elevator shaft 128 surround at least two-hundred-seventy degrees around elevator portion 112 (either continuously or discontinuously), then it is equivalent to being completely surrounding.

In the illustrated embodiment, elevator portion 112 comprises helical auger 132, and shelving portion 104 includes guide rails 134 that extend along the inner surface of elevator shaft 128, parallel to shelf axis 122. Thereby, items 120 that are positioned on auger 132 (e.g., by storing portion 116) can be moved vertically by auger 132. More specifically, an item 120 can be forced slightly past the outer edge of auger 132 (e.g., by auger 132 having an upper surface that slopes downwards from the center or by centrifugal force of auger 132 turning) to contact one of guide rails 134. The particular guide rail 134 will prevent the item 120 from merely rotating with auger 132 (since friction between the item 120 and auger 132 would otherwise prevent the item 120 from moving up or down auger 132), such that the rotation of auger 132 can move the item 120 up (or down) in elevator shaft 128. Once the item 120 has reached its destination shelf 106, the corresponding door 130 can be opened to allow item 120 to slide onto the shelf 106. This can occur, for example, by shelves 106 having upper surfaces that slope downwards from inner sides 126 or by centrifugal force of auger 132 and shelving portion 102 turning together at the same speed. Thereby, the item 120 can be placed at the outwardmost (or outwardmost available) radial position on the shelf 106 as to be easily reachable by a consumer.

Figure 3:
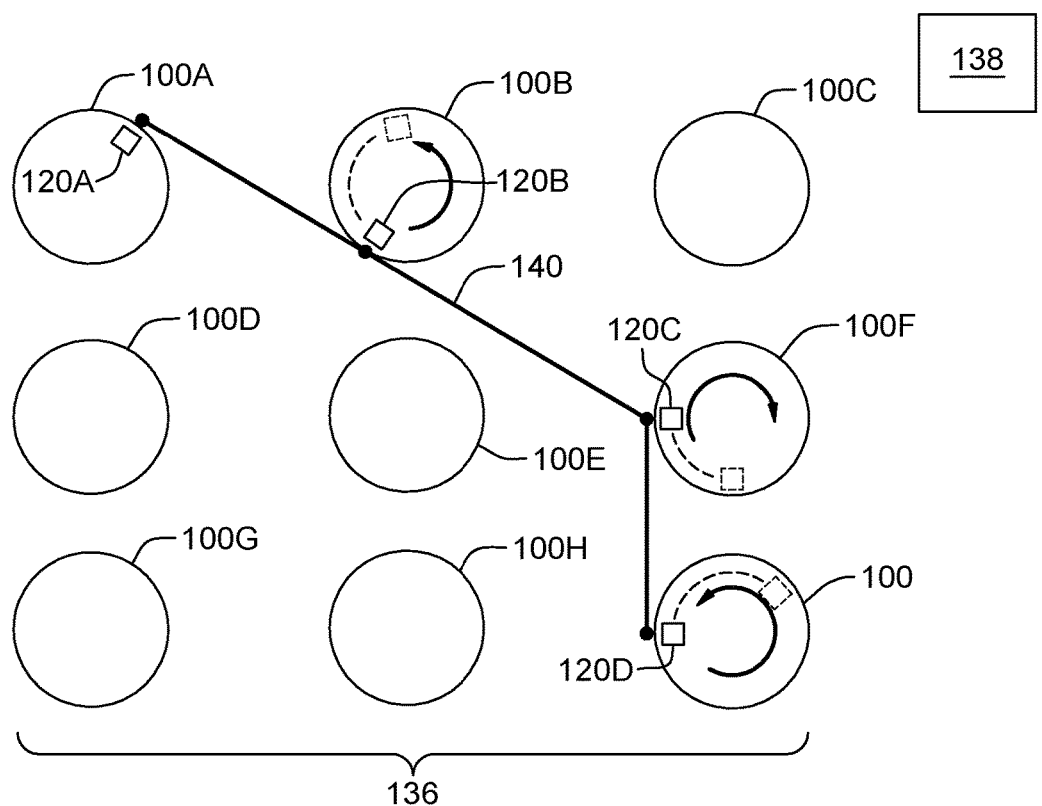
FIG. 3 is a top view of the array of item storage systems, in accordance with an embodiment of the present disclosure.

FIG. 3 is a top view of array 136 of ISSs 100A-100I (collectively, ISSs 100). In the illustrated embodiment, array 136 is controlled by manager 138, which is a computer system that is communicatively connected to the controllers 105 (shown in FIG. 1) for each ISS 100. Manager 138 can instruct any of ISSs 100 to rotate in either direction and/or stop any of ISSs 100 in any given position. These actions can be for display purposes, to reduce consumer movement (e.g., if two sought after items 120 are located on opposite sides of the same ISS 100), and/or as a coordinated plan to assist a consumer with finding products that they may desire.

In some embodiments, manager 138 includes an interface (e.g., a software application) for a consumer to enter their shopping list. In some embodiments, manager 138 includes machine learning techniques to learn the shopping habits of consumers as to be able to predict what a consumer will seek to buy based on what the consumer has already picked up and/or what the most commonly selected products are. In any of these embodiments, manager 138 can plot path 140 through array 136 that allows a customer to pick up all of the items that they are likely to be seeking while minimizing the distance that the customer needs to traverse. This can be done using information from each ISS 100 regarding what items 120 are located on what shelves 106 (shown in FIG. 1) and the circumferential position(s) on those shelves 106, for example, from sensors 110 (shown in FIG. 1).

According to one example, if a consumer has items 120A-120C on their shopping list, then it can be assumed that the consumer is likely to be seeking items 120A-120C. In addition, if item 120D would complement some or all of items 120A-120C (and/or if item 120D is a very popular item in general), then it can be assumed that the consumer is likely to be seeking item 120D as well. Therefore, manager 138 can instruct ISSs 100B, 100F, and 100I to rotate as indicated. This places items 120B-120D at specific circumferential positions on their respective ISSs 100 that are proximate to path 140 (and item 120A was already in the correct location proximate the consumer as they entered array 136, so its circumferential position did not need to be changed). Such control of array 136 by manager 138 can provide an optimal shopping experience for the consumer as well as targeted advertising based on what the consumer is seeking and/or has picked up.

Figure 4:
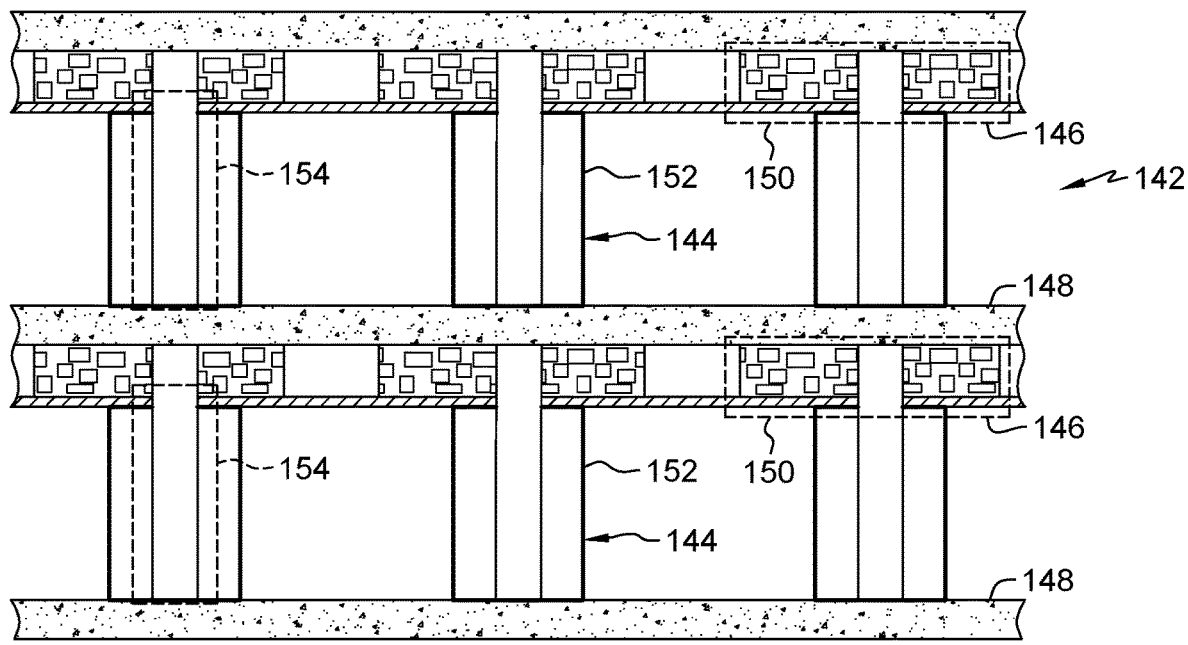
FIG. 4 is a cross-section side view of an alternate embodiment array of item storage systems, in accordance with an embodiment of the present disclosure.

FIG. 4 is a cross-section side view of an alternate embodiment array 142 of alternate embodiment ISSs 144. In the illustrated embodiment, there are drop ceilings 146 so there is a space beneath each floor 148. This allows for storing portions 150 to be located above shelving portions 152. In such an embodiment, elevator portions 154 move items 120 down, and elevator portions may include radial ridges along their augers (not shown) to prevent items 120 from sliding down due to gravity.

Figure 5:
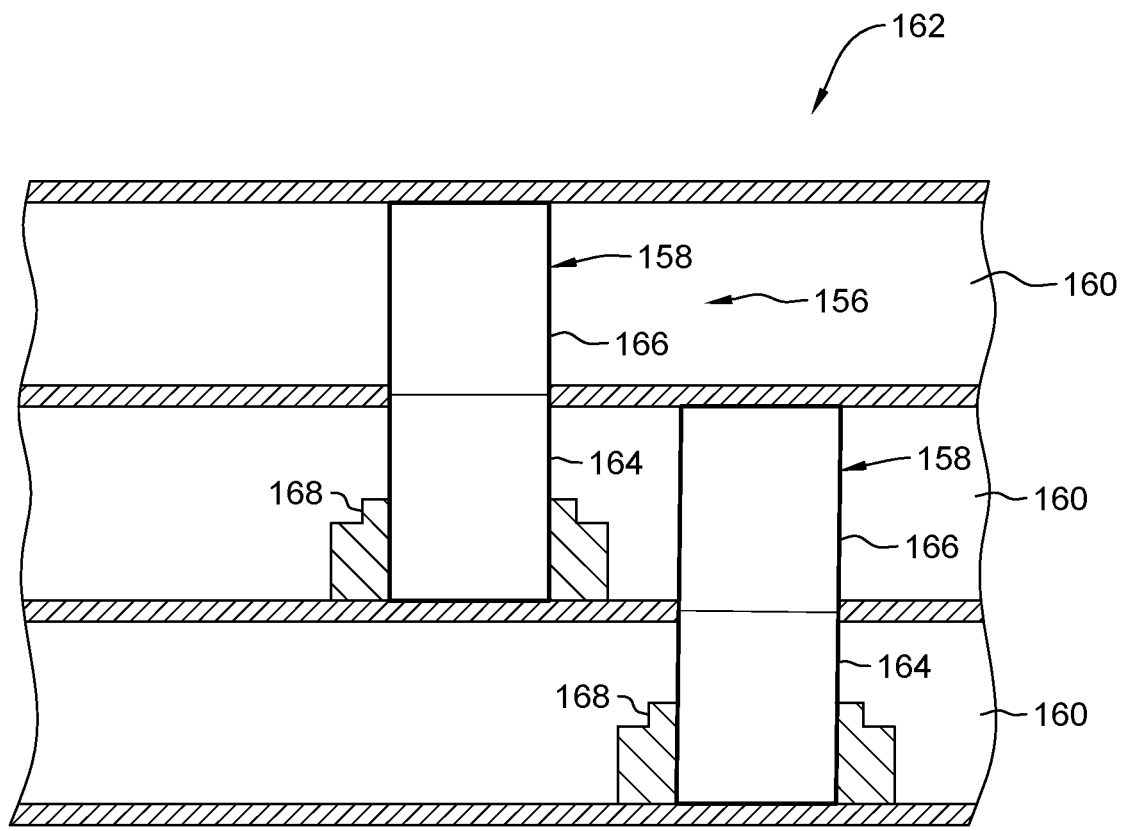
FIG. 5 is a cross-section side view of an alternate embodiment array of item storage systems, in accordance with an embodiment of the present disclosure.

FIG. 5 is a cross-section side view of an alternate embodiment array 156 of ISSs 158. In the illustrated embodiment, ISSs 158 vertically span two stories 160 of building 162. Thereby, storing portions 164 can be directly beneath (or above) shelving portions 166. Such an embodiment does not require extra space in the ceiling or floor for the components of ISSs 158. In addition, seating 168 can be positioned around storing portions 164 to allow for consumers (not shown) to benefit from the presence of shelving portions 166 being in the middle of stories 160.

Figure 6:
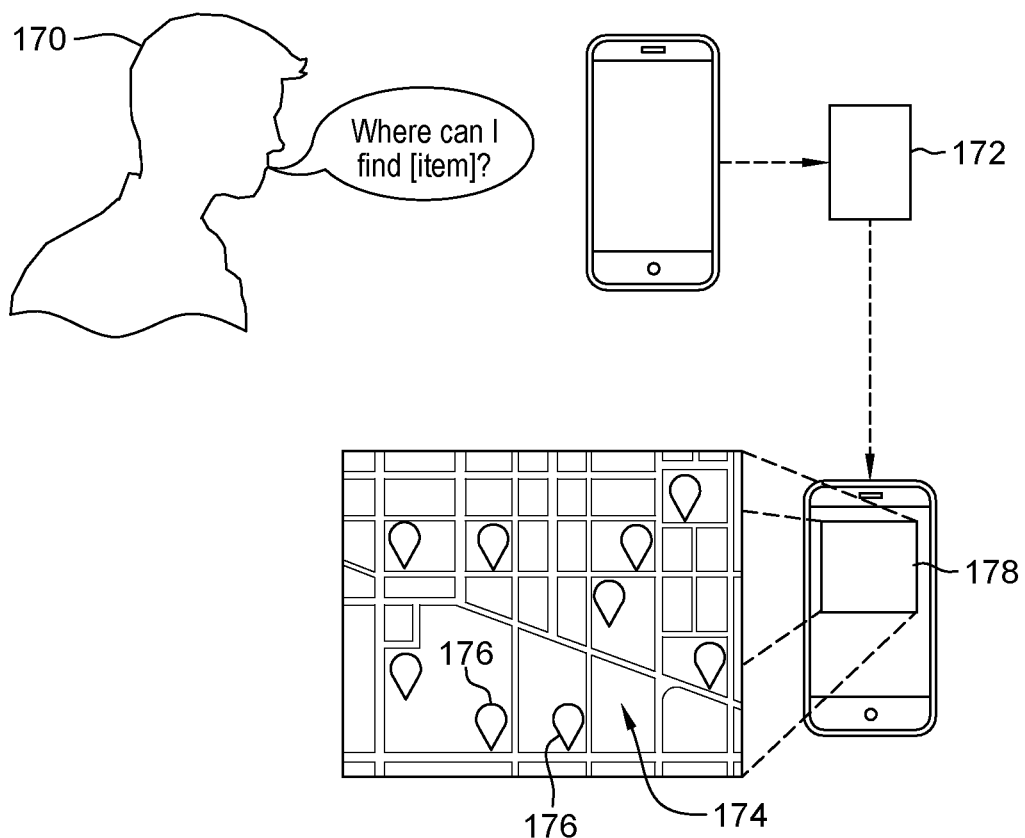
FIG. 6 is a schematic view of a user communicating with a manager of an array of item storage systems, in accordance with an embodiment of the present disclosure.

FIG. 6 is a schematic view of consumer 170 communicating with manager 172 of an alternate embodiment array 174 of ISSs 176. In the illustrated embodiment, consumer 170 is using software application 178 to indicate that they are seeking a particular item (e.g., one of a plurality of items in a shopping list). Software application 178 can communicate with manager 172 of ISSs 176 to determine where the sought-after item is located. These locations are then reflected in the graphical user interface (GUI) of software application 178. In alternate embodiments, software application 178 can communicate directly with each controller (not shown) of each ISS 176.

Figure 7A:
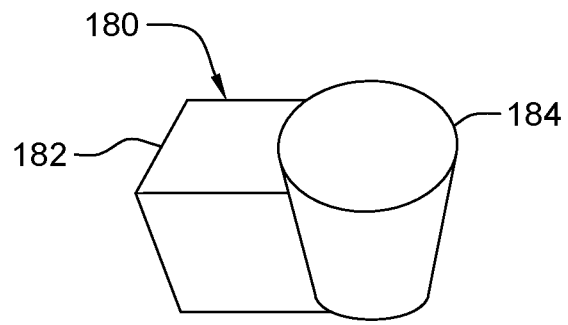
FIG. 7A is a perspective view of an alternate embodiment item storage system, in accordance with an embodiment of the present disclosure.
Figure 7B:
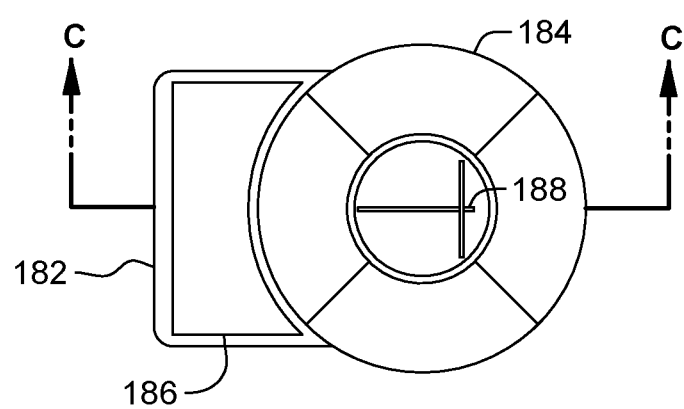
FIG. 7B is a top view of an alternate embodiment item storage system, in accordance with an embodiment of the present disclosure.
Figure 8:
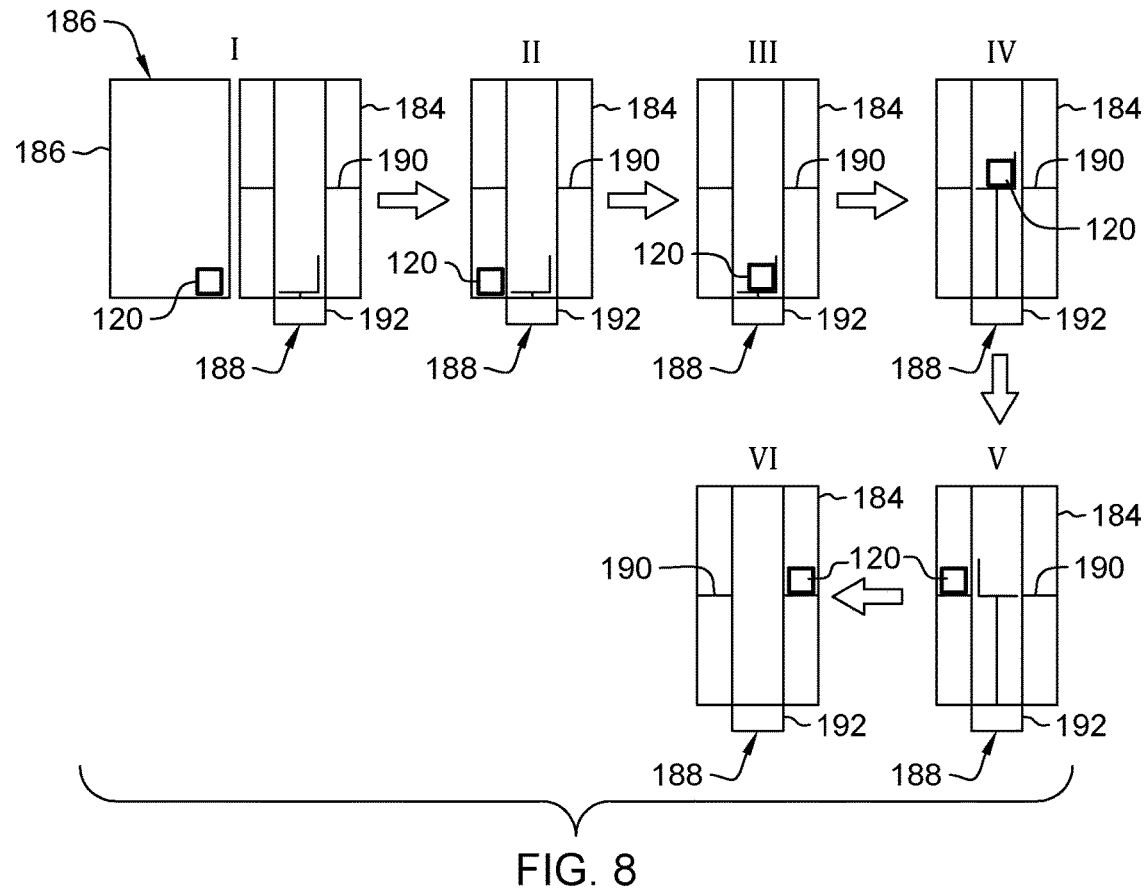
FIG. 8 is a series of cross-section side views of the alternate embodiment item storage system along line C-C in FIG. 7B showing the replenishing of an item, in accordance with an embodiment of the present disclosure.

FIG. 7A is a perspective view of alternate embodiment ISS 180, and FIG. 7B is a top view of ISS 180. FIG. 8 is a series of cross-section side views of ISS 180 along line C-C in FIG. 7B showing the replenishing of item 120. FIGS. 7A, 7B, and 8 will now be discussed in conjunction with each other.

In the illustrated embodiment, replenishment portion 182 is adjacent to (i.e., alongside and inside) shelving portion 184. More specifically, replenishment portion 184 includes storage portion 186 that is alongside shelving portion 184 and elevator portion 188 that is inside shelving portion 184. Since shelving portion 184 can rotate, there is consumer access to shelving portion 182 on three sides. In addition, storage portion 186 is easily accessible (as it is not in the ceiling or floor), so it can be loaded from the back or sides by an operator that is in the shopping area.

In order to replenish an item 120 in shelving portion 184, storage portion 186 moves item 120 over to elevator portion 188 as shown in views I, II, and III of FIG. 8. Then, elevator portion 188 moves item 120 up to its destination shelf 190 as shown in view IV. In the illustrated embodiment, elevator portion 188 includes linear actuator 192 that moves straight up and down (as opposed to using an auger, guide rods, and doors) to transport item 120. Once item 120 is brought to the level of destination shelf 190, elevator portion 188 pushes item 120 over onto destination shelf 190 as shown in view V. Then, shelving portion 184 can rotate item 120 to an appropriate circumferential position to be picked up by a consumer, as shown in view VI.

Figure 9A:
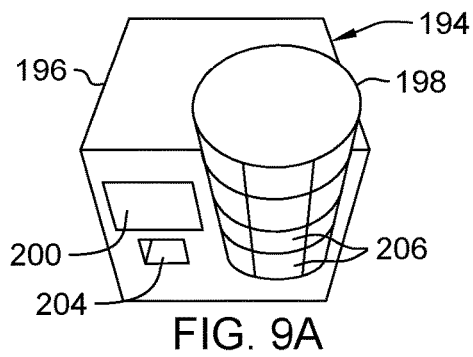
FIG. 9A is a perspective view of an alternate embodiment item storage system, in accordance with an embodiment of the present disclosure.
Figure 9B:
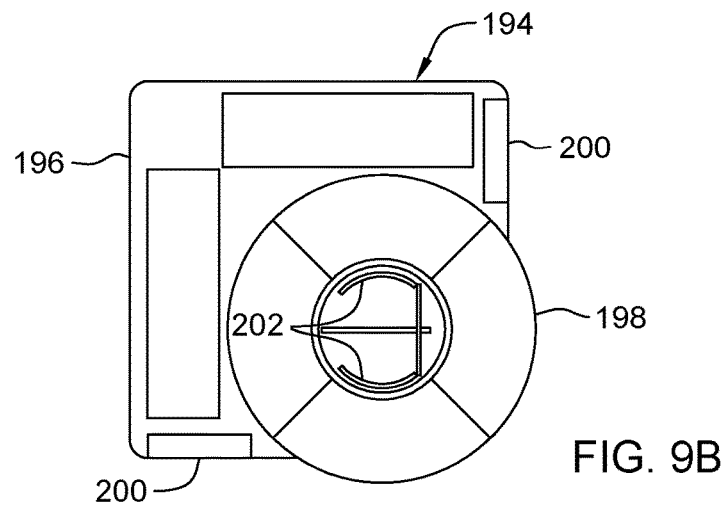
FIG. 9B is a top view of an alternate embodiment item storage system, in accordance with an embodiment of the present disclosure.

FIG. 9A is a perspective view of an alternate embodiment ISS 194, and FIG. 9B is a top view of an alternate embodiment ISS 194. ISS 194 can be similar to ISS 180 (shown in FIGS. 7A and 7B), although storage portion 196 of ISS 194 covers two sides of shelving portion 198. In addition, ISS 194 is configured to be used as a stand-alone vending machine, so ISS 194 includes two interfaces 200 for customers to, for example, control the rotation of shelving portion 198, find the positions of specific items 120 (that may be located on this ISS 194 or other ISSs 194), and to pay for any selected items 120. Also, shelving portion 198 is not open but is covered to prevent theft. Instead, ISS 194 can include fingers 202 to retract selected items 120 from shelving portion 198 so that items 120 can be transported to pickup box 204. In the alternative to pickup box 204, shelving portions 198 can have automated exterior doors that can be opened after a purchase has been made. Thereby, fingers 202 can push the purchased item 120 out of ISS 194 for the consumer to receive.

Figure 10:
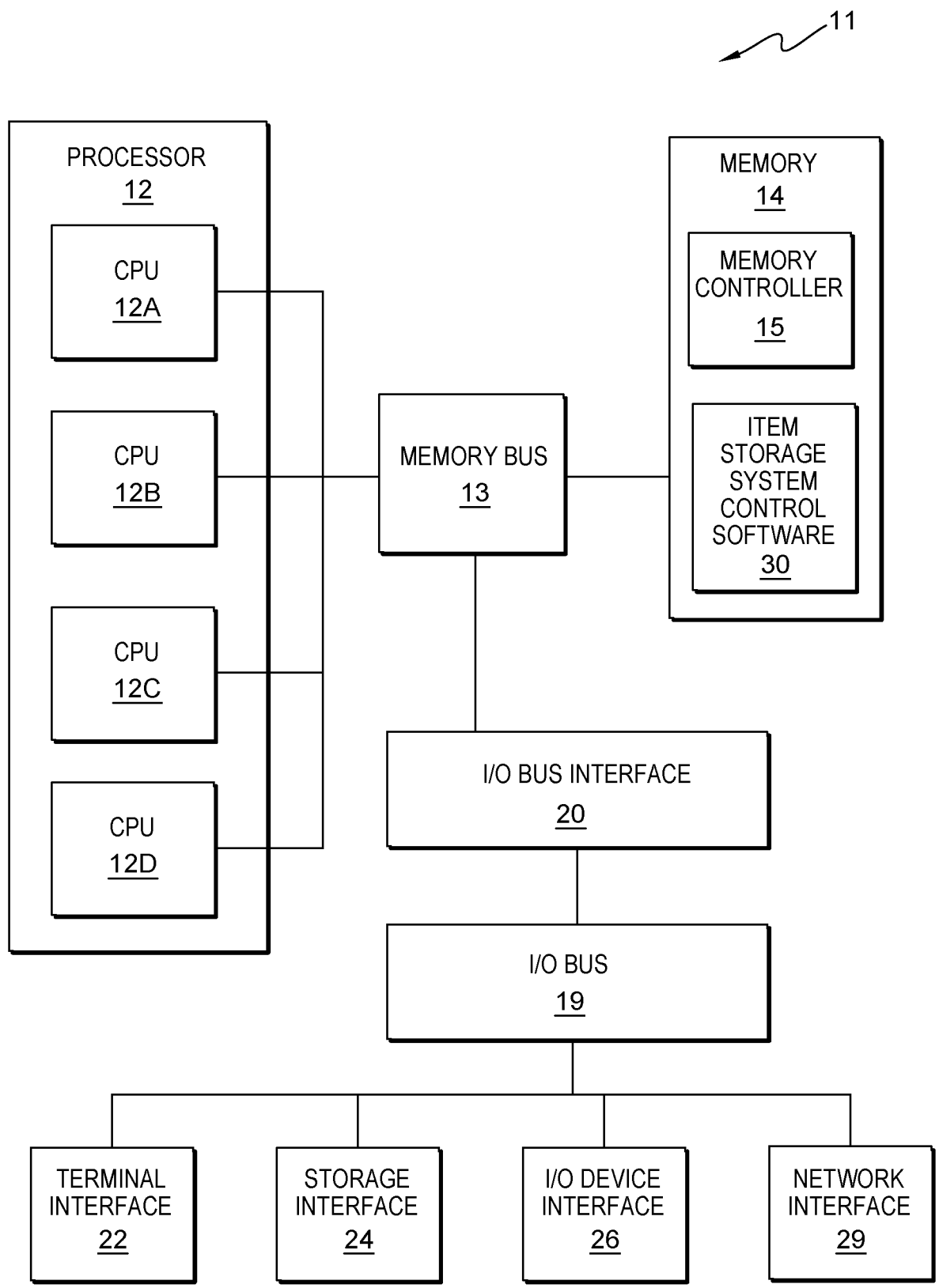
FIG. 10 shows a high-level block diagram of an example computer system that can be used in implementing embodiments of the present disclosure.

Referring now to FIG. 10, shown is a high-level block diagram of an example computer system (i.e., computer) 11 that may be used in implementing one or more of the methods or modules, and any related functions or operations, described herein (e.g., using one or more processor circuits or computer processors of the computer), in accordance with embodiments of the present disclosure. For example, computer system 11 can be used for controller 105, manager 138, and manager 172 (shown in FIGS. 1, 3, and 6, respectively). In some embodiments, the components of the computer system 11 may comprise one or more CPUs 12, a memory subsystem 14, a terminal interface 22, a storage interface 24, an I/O (Input/Output) device interface 26, and a network interface 29, all of which may be communicatively coupled, directly or indirectly, for inter-component communication via a memory bus 13, an I/O bus 19, and an I/O bus interface unit 20.

The computer system 11 may contain one or more general-purpose programmable central processing units (CPUs) 12A, 12B, 12C, and 12D, herein generically referred to as the processer 12. In some embodiments, the computer system 11 may contain multiple processors typical of a relatively large system; however, in other embodiments the computer system 11 may alternatively be a single CPU system. Each CPU 12 may execute instructions stored in the memory subsystem 14 and may comprise one or more levels of on-board cache.

In some embodiments, the memory subsystem 14 may comprise a random-access semiconductor memory, storage device, or storage medium (either volatile or non-volatile) for storing data and programs. In some embodiments, the memory subsystem 14 may represent the entire virtual memory of the computer system 11 and may also include the virtual memory of other computer systems coupled to the computer system 11 or connected via a network. The memory subsystem 14 may be conceptually a single monolithic entity, but, in some embodiments, the memory subsystem 14 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. Memory may be further distributed and associated with different CPUs or sets of CPUs, as is known in any of various so-called non-uniform memory access (NUMA) computer architectures. In some embodiments, the main memory or memory subsystem 14 may contain elements for control and flow of memory used by the processor 12. This may include a memory controller 15.

Although the memory bus 13 is shown in FIG. 10 as a single bus structure providing a direct communication path among the CPUs 12, the memory subsystem 14, and the I/O bus interface 20, the memory bus 13 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 20 and the I/O bus 19 are shown as single respective units, the computer system 11 may, in some embodiments, contain multiple I/O bus interface units 20, multiple I/O buses 19, or both. Further, while multiple I/O interface units are shown, which separate the I/O bus 19 from various communications paths running to the various I/O devices, in other embodiments some or all of the I/O devices may be connected directly to one or more system I/O buses.

In some embodiments, the computer system 11 may be a multi-user mainframe computer system, a single-user system, or a server computer or similar device that has little or no direct user interface but receives requests from other computer systems (clients). Further, in some embodiments, the computer system 11 may be implemented as a desktop computer, portable computer, laptop or notebook computer, tablet computer, pocket computer, telephone, smart phone, mobile device, or any other appropriate type of electronic device.

In the illustrated embodiment, memory subsystem 14 further includes item storage system control software 30. The execution of item storage system control software 30 (for example, using the execution module) enables computer system 11 to perform one or more of the functions described above, for example, to operate an item storage system, including replenishing items, communicating with a manager and/or user application software, and receiving inputs from an interface.

It is noted that FIG. 10 is intended to depict representative components of an exemplary computer system 11. In some embodiments, however, individual components may have greater or lesser complexity than as represented in FIG. 10, components other than or in addition to those shown in FIG. 10 may be present, and the number, type, and configuration of such components may vary.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 11:
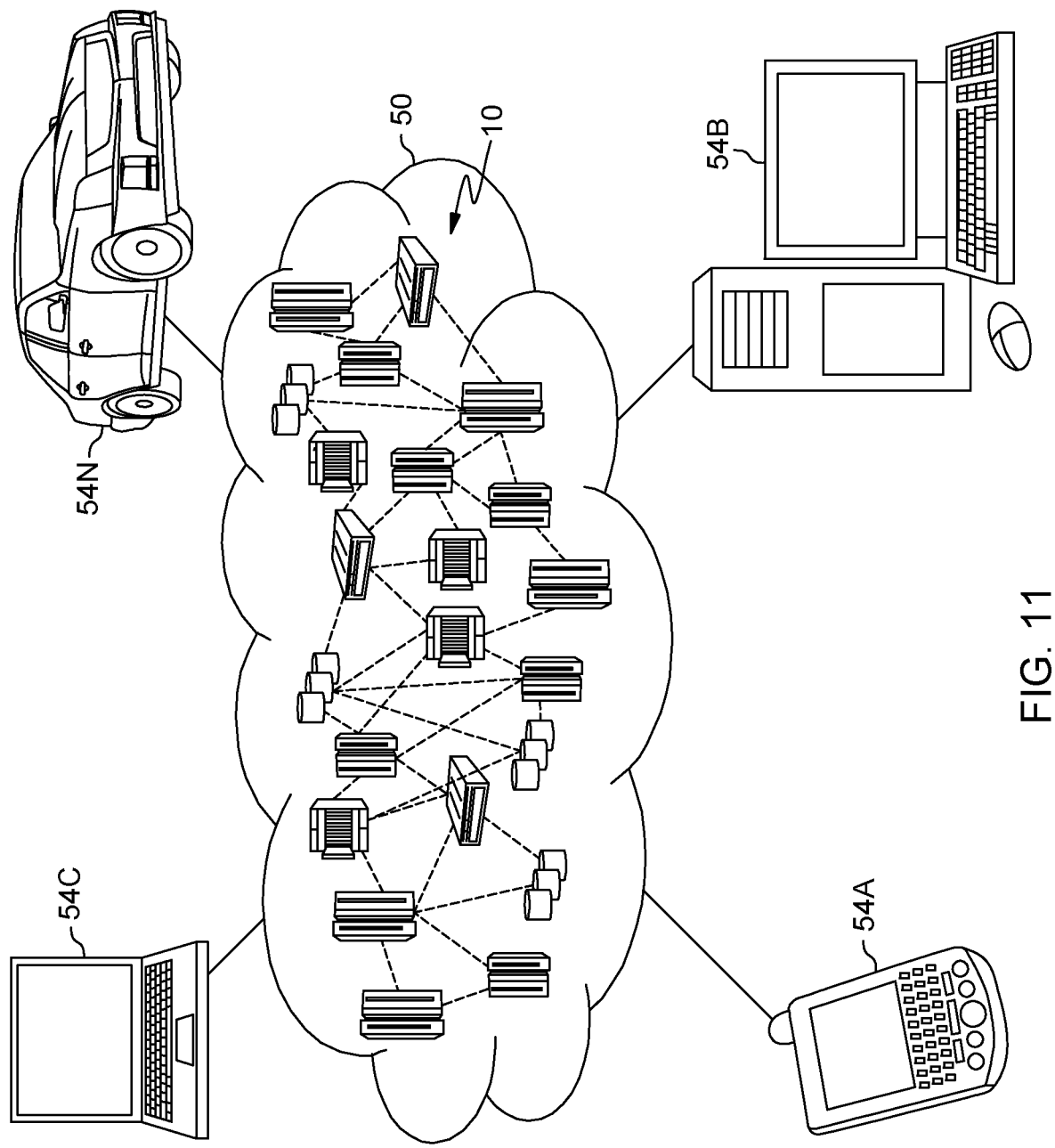
FIG. 11 shows a cloud computing environment, in accordance with an embodiment of the present disclosure.

Referring now to FIG. 11, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 11 are intended to be illustrative only and that computing nodes 10 and cloud computing environment 50 can communicate with any type of computerized device over any type of network and/or network addressable connection (e.g., using a web browser).

Figure 12:
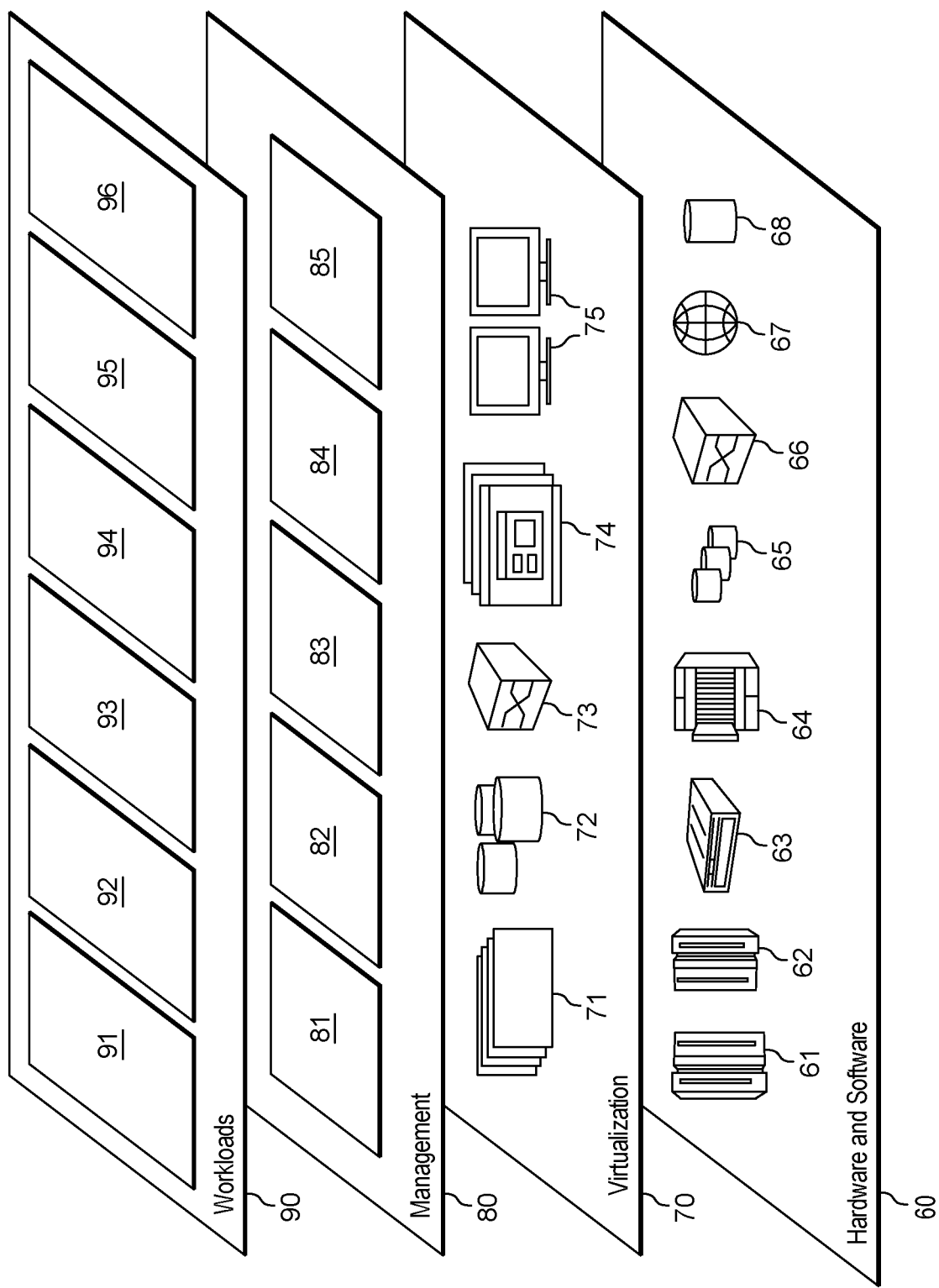
FIG. 12 shows abstraction model layers, in accordance with an embodiment of the present disclosure.

Referring now to FIG. 12, a set of functional abstraction layers provided by cloud computing environment 50 (FIG. 11) is shown. It should be understood in advance that the components, layers, and functions shown in FIG. 12 are intended to be illustrative only and embodiments of the invention are not limited thereto. s depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and item storage system control module 96.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. An item storage system comprising:
   a shelving portion comprising:
      a first shelf having a toroidal shape with a center axis; and
      a second shelf having a toroidal shape that is spaced apart from the first shelf along the center axis;
      wherein the shelving portion is located between a floor and a ceiling; and
   a replenishment portion comprising:
      an elevator portion configured to deliver items to the first shelf and the second shelf, wherein at least part of the elevator portion is positioned in the center of the shelving portion and is surrounded by the shelving portion; and
      a storing portion configured to load items into the elevator portion, wherein the storing portion is positioned above or below the shelving portion and the storing portion is positioned below the floor or above the ceiling.

2. The item storage system of claim 1, further comprising:
   an actuator connected to the first shelf and the second shelf that is configured to rotate the first shelf and the second shelf.

3. The item storage system of claim 2, further comprising:
   a controller communicatively connected to the actuator, wherein the controller is configured to cause an item on the first shelf to be positioned in an outwardmost radial position and at a specific circumferential position.

4. The item storage system of claim 3, wherein the controller is communicatively connected to a manager that controls an array of item storage systems to which the item storage system belongs.

5. The item storage system of claim 1, further comprising:
   a sensor to monitor a number of items on the first shelf.

6. The item storage system of claim 5, further comprising:
   a controller communicatively connected to the sensor and the replenishment portion, wherein the controller is configured to cause the replenishment portion to bring items to the first shelf if the number of items is insufficient.

7. The item storage system of claim 1, wherein the elevator portion comprises a helical auger and a plurality of guide rails extending along an elevator shaft parallel to the center axis to move items to the first shelf.

8. The item storage system of claim 1, wherein the elevator portion comprises a linear actuator to move items to the first shelf.

9. An item storage system comprising:
   a shelving portion comprising:
      a first shelf that is rotatable about a center axis;
      a second shelf that is rotatable about the center axis and is spaced apart from the first shelf; and
      an actuator connected to the first shelf and the second shelf that is configured to rotate the first shelf and the second shelf;
      wherein the shelving portion is located between a floor and a ceiling; and a replenishment portion that is positioned adjacent to the shelving portion, the replenishment portion comprising:
  an elevator portion configured to deliver items to the first shelf and the second shelf; and
  a storing portion configured to load items into the elevator portion, wherein the storing portion is positioned below the floor or above the ceiling.

10. The item storage system of claim 9, further comprising:
  a controller communicatively connected to the actuator, wherein the controller is configured to cause an item on the first shelf to be positioned in an outwardmost radial position and at a specific circumferential position.

11. The item storage system of claim 10, wherein the controller is communicatively connected to a manager that controls an array of item storage systems to which the item storage system belongs.

12. The item storage system of claim 9, further comprising:
  a sensor to monitor a number of items on the first shelf.

13. The item storage system of claim 12, further comprising:
  a controller communicatively connected to the sensor and the replenishment portion, wherein the controller is configured to cause the replenishment portion to bring items to the first shelf if the number of items is insufficient.

14. The item storage system of claim 9, wherein the elevator portion comprises a helical auger and a plurality of guide rails extending along an elevator shaft parallel to the center axis to move items to the first shelf.

15. The item storage system of claim 9, wherein the elevator portion comprises a linear actuator to move items to the first shelf.

* * * * *